United States Patent
Thompson

(10) Patent No.: US 8,369,295 B2
(45) Date of Patent: Feb. 5, 2013

(54) METHOD TO PROVIDE CONNECTIVITY AND POWER FOR DIFFERENT AIRCRAFT SUB-SYSTEMS VARYING IN LEVELS OF CRITICALITY AND INTENDED PURPOSES WHILE USING A SINGLE PARTITIONED AIRBORNE LOCAL AREA NETWORK (ALAN)

(76) Inventor: Mark Stephen Thompson, Rancho Santa Margarita, CA (US)

( * ) Notice: Subject to any disclaimer, the term of this patent is extended or adjusted under 35 U.S.C. 154(b) by 670 days.

(21) Appl. No.: 12/553,087

(22) Filed: Sep. 2, 2009

(65) Prior Publication Data
US 2010/0195634 A1 Aug. 5, 2010

Related U.S. Application Data

(60) Provisional application No. 61/094,403, filed on Sep. 4, 2008.

(51) Int. Cl.
*H04W 4/00* (2009.01)
*H04L 12/28* (2006.01)
*G06F 1/00* (2006.01)

(52) U.S. Cl. ........ 370/338; 370/389; 370/392; 370/401; 713/300

(58) Field of Classification Search ........ 701/3
See application file for complete search history.

(56) References Cited

U.S. PATENT DOCUMENTS

| | | | |
|---|---|---|---|
| 2006/0053324 A1* | 3/2006 | Giat et al. | 713/300 |
| 2007/0101169 A1* | 5/2007 | Male et al. | 713/300 |
| 2007/0183435 A1* | 8/2007 | Kettering et al. | 370/401 |
| 2008/0052386 A1* | 2/2008 | Johnson et al. | 709/223 |
| 2008/0137759 A1* | 6/2008 | Cai et al. | 375/257 |

\* cited by examiner

*Primary Examiner* — Brandon Renner
(74) *Attorney, Agent, or Firm* — Dennis R. Haszko

(57) ABSTRACT

System for providing non-flight critical aircraft sub-system communication, over an ALAN, meeting DO-254/DO-178 certification. This system deterministically makes data available to each aircraft sub-system without regard to specific bandwidth requirements. This system network supports functions that are certified on a non-interference basis. The system network deterministically places all non-required functionality into a low priority to assure that all required data functions sets are not dropped. One aspect of this system is how the clients are able to join sessions. In this system, network clients are preprogrammed based on their hardware coding to be able to join a specific LVAN, or LVANs, in accordance with their predetermined functions. The present system is an ALAN based on a ring Ethernet topology, for redundancy, which provides two paths to each connection point without requiring all the wiring associated with a star wiring topology.

42 Claims, 9 Drawing Sheets

Figure 1:
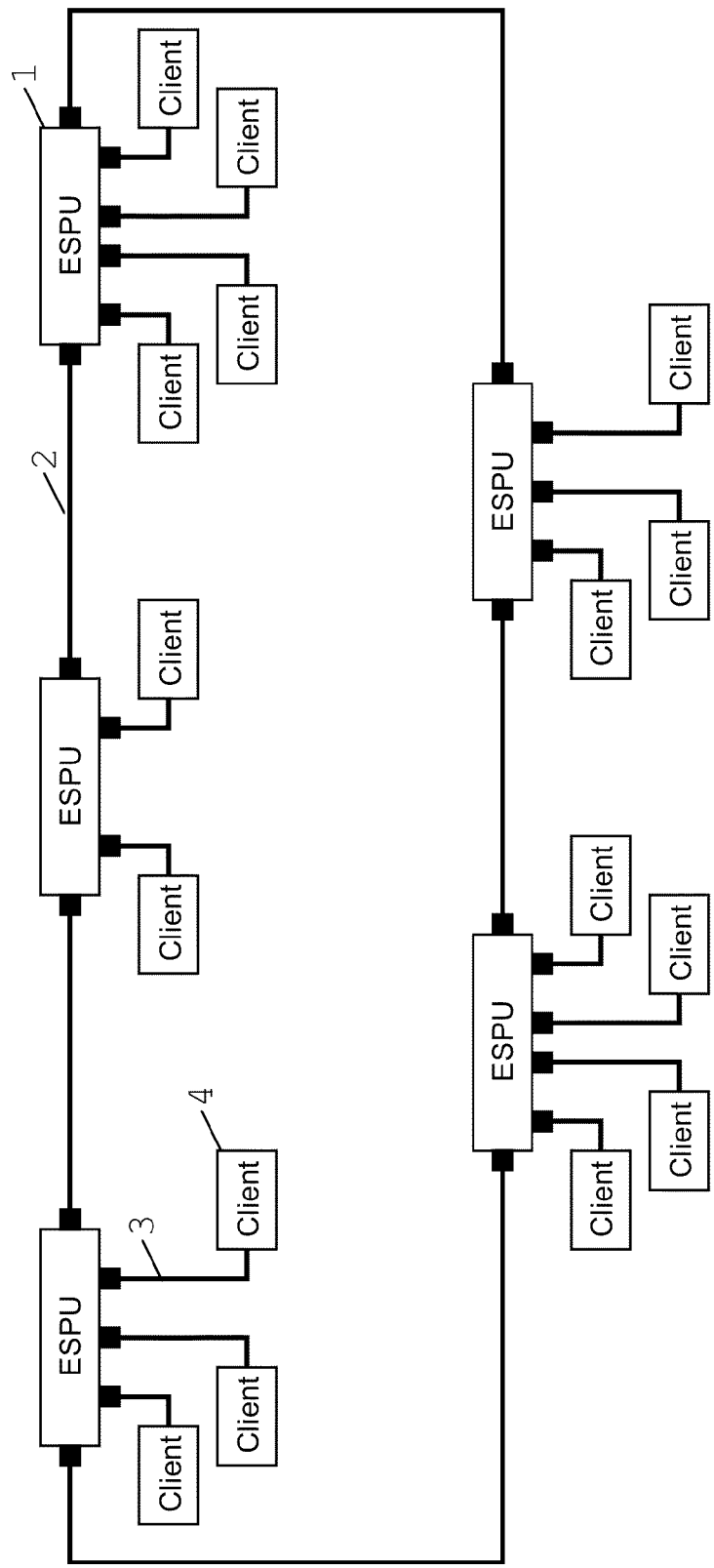

METHOD TO PROVIDE CONNECTIVITY AND POWER FOR DIFFERENT AIRCRAFT SUB-SYSTEMS VARYING IN LEVELS OF CRITICALITY AND INTENDED PURPOSES WHILE USING A SINGLE PARTITIONED AIRBORNE LOCAL AREA NETWORK (ALAN)

CROSS-REFERENCE TO RELATED APPLICATIONS

This application claims the benefits of provisional patent application Ser. No. 61/094,403 file 2008 Sep. 4 by the present inventor.

OTHER REFERENCES

FAA AC 20-152, RTCA, Inc., Document RTCA/DO-254, Design Assurance Guidance for Airborne Electronic Hardware, Jul. 5, 2005
RTCA/DO-254, Design Assurance Guidance for Airborne Electronic Hardware, Apr. 19, 2000
RTCA/DO-178B, Software Considerations in Airborne Systems and Equipment Certification, Dec. 22, 1992
FAA AC 20-115B, RTCA, Inc, Document RTCA/DO178B, Jan. 11, 1993
IEEE 802.3af, DTE Power via MDI, June 2003
IEEE802.1x, Port Based Network Access Control, 2001
IEEE 802.11a, Wireless Local Area Network Standard, 1999
IEEE 802.11b, Wireless Local Area Network Standard, 1999
IEEE 802.11g, Wireless Local Area Network Standard, 2003
IEEE 802.16, Air Interface for Fixed Broadband Wireless Access Systems, 2004
IEEE 802.1P, Traffic Class Expediting and Dynamic Multicast Filtering, Published in 802.1D-1998
IEEE 802.1Q, Virtual LANs, Nov. 10, 2006

FEDERALLY SPONSORED RESEARCH

Not Applicable

SEQUENCE LISTING OR PROGRAM

Not Applicable

BACKGROUND

1. Field of the Invention

This invention provides connectivity and power for different aircraft sub-systems varying in levels of criticality and intended purposes while using a single partitioned Airborne Local Area Network (ALAN).

2. Prior Art

Aircraft systems require different levels of critically as defined in DO-254/DO-178 based on the consequence of the system not meeting its intended functions. Typically each type of system is partitioned based on its criticality into individual physical networks. This type of aircraft system design provides for a robust and deterministic control of each level of critically. At same time sub-systems of the same criticality level are partitioned based on the intended functional purpose. Each network implementation requires unique hardware and wiring, which increases the weight, and cost of each of aircraft sub-system. This invention provides a means to meet the requirements of DO-254/DO-178 by partitioning a single physical network into robust and deterministic network domains that are functionally separate while using a single physical ALAN.

While DO-254/DO-178 define methods of compliance to meet aircraft certification requirements for systems and subsystem, they do not address network security aspect required by an ALAN when attached to a Wide Area Network (WAN). Due to the constant introduction of new means to infect networks thru software and hardware, it is highly unlikely that any WAN connection can rely on a pure OSI layer 3 implementation to provide the heightened level of security required by an aircraft ALAN. The same method of network control to meet DO-254/DO-178 can be extended to meet the security requirements based on deterministic non-modifiable means to restrict access to the aircraft systems. Usage of preprogrammed hardware that is not user modifiable provides a level of security that is unachieved thru any other means. Simultaneously, this preprogrammed hardware can do a package payload encryption on both insertion and extraction points of network to provide a means that no external network snooping is able to determine packet contents.

Unlike Avionics Full-Duplex Switched Ethernet (AFDX), used for flight critical applications today, this invention provides a deterministic means to make data available to each aircraft sub-system at all times, without the need to create specific aircraft sub-system bandwidth requirements. Further, AFDX is a one to many type of data datagram, while this invention provides a many to many datagram allowing network nodes to join multiple multicast sessions. The key different between the AFDX method of network control and this invention is how the clients are able to join sessions. In this invention network clients are preprogrammed, based on their hardware coding, to be able to join a specific LVAN, or LVANs in accordance with their predetermined functions.

This invention places Ethernet packets onto the network in a measured, spaced out in the time domain pseudo-randomly, thus greatly reducing the possibility of switch buffer over flows causing loss of data. Further, this invention supports functions on a non-interference basis. Furthermore, this invention has a deterministic means to place all non-required functionality into a low priority to assure that all required data functions sets are not dropped.

OBJECTS AND ADVANTAGES

This invention, herein after referred to as 1Net, is an ALAN based on a ring Ethernet topology, for redundancy, which provides two paths to each connection point without requiring all the wiring associated with a star wiring topology.

1Net is a single aircraft network able to host numerous cockpit and cabin functions within a single powered data network while meeting the requirements of DO-254/DO-178. 1Net combines standard networks functions with hardware controlled network portioning. This partitioning is done in two independent ways eliminating the need to have multiple physical networks to provide absolute isolation of network data. The 1Net system is simple in design utilizing field programmable gate arrays (FPGAs) to control network data access and denial. These FPGAs provide the basis to enable network attached clients to provide functionality to the 1Net system.

1NET is a modular local area network (LAN) providing aircraft system architects the ability to host a plurality of functions on a single physical LAN. The core components of an 1NET architecture consist of two different core units, a Connectivity Server Unit (CSU) and a Ethernet Switch Power Unit (ESPU). The CSUs provide processing, data stowage & retrieval, network switching, out of 1Net LAN data connectivity, and wireless in 1Net LAN connectivity. The ESPUs provides two gigabit (Gb) switching truck links and eight 100 BaseT with Power over Ethernet (PoE) or other low voltage drops.

1Net functionality is provided by attaching a variety of client units to the ESPU drop connections. Typical clients include, but are not limited, to Passenger Media Players, Cabin Attendant Terminals, Cockpit Crew Terminals, Network Cameras, Radio Frequency Identification Units, Pico Cells, Wireless Access Points, Aircraft Network Adaptors, and Handsets/Headset Panels. The ESPU provides power to these clients PoE or other low voltage.

The physical 1Net LAN is wired as a ring. By wiring it in this fashion no 1Net client LAN connectivity loss will occur due to any single wiring disconnection between ESPU Gb trunk links. Further, two wiring disconnects between ESPUs, on the same Gb trunk link column, would only result in the loss of clients on ESPUs between those disconnects.

1Net is designed to host varying levels of criticality and/or varying levels of security the 1Net LAN must be deterministic without usage of software meeting DO-254 complex devices requirements. This is achieved by controlling 1Net LAN access both at the ESPU and at each client independently solely with hardware.

1Net utilizes the LAN Ethernet packets virtual LAN (VLAN) preamble as classes of service. 1Net utilizes the LAN Ethernet packet header "To MAC" as data domains by using the IEEE MAC multicast addresses. Thereby, the 1Net classes of service can be sub-partitioned into data domains, or conversely, data domains can be sub-partitioned into classes of service. Alternatively, data domains and classes of service could be utilized in a serial manner for heightened levels of security or utilized independently for broader partitioning of 1Net LAN data. 1Net clients are able to subscribe to multiple classes of service and multiple data domains simultaneously. This implementation allows 1Net to be setup in a plurality of configuration based upon the desired aircraft application the 1Net is used for.

Access to 1Net classes of service is controlled by an FPGA embedded in every client attached to a 1Net LAN. This embedded FPGA is placed between the client's physical Ethernet interface to the 1Net LAN and is preprogrammed with the VLAN preamble 1Net class of services available to and from the client. The embedded FPGA filters out all 1Net LAN Ethernet packets not containing a VLAN preamble 1Net class of service preprogrammed to be available to or from the clients processing device.

Access to 1Net data domains is controlled by a managed switch controlled by a FPGA in all 1Net ESPUs. These embedded devices in the ESPU control routing means of the 1Net LAN Ethernet packets on and off the Gb trunk link column to the ESPU 1Net client 100bT powered drops. To perform this routing the ESPU embedded FPGA is preprogrammed with multicast MAC address 1Net data domains that are always routed to and from all ESPU drops for basic 1Net LAN management. The FPGA in turn sets up the switch to route 1Net LAN Ethernet packets with those multicast MAC address 1Net data domains to all ESPU 1Net client 100bT powered physical ports. Additionally, the ESPU embedded FPGA is capable of receiving requests from an 1Net client attached to any particular ESPU physical port to have an additional data domain routed to and/or from the trunk link to that requesting drop. This is accomplished by the 1Net client FPGA sending a LAN Ethernet management packet to the ESPU containing a request to subscribe or unsubscribe to and the data domain multicast MAC address.

These two FPGAs provide an absolute filter between the 1Net network and the client to classes of services and data domains that the client can interact with and those classes of service and data domains that are denied to the client's processing device.

On an abstract level, a 1Net can be architected to host a plurality of functions, related or unrelated, varying in criticality and/or security, simultaneously. Further, these functions can have varying degrees of interactions depending on the architect's preprogramming of the client's embedded FPGA device and the ESPU's embedded FPGA. Furthermore, as aircraft functions can be absolutely partitioned independently by class of service and/or data domains, functions of varying degrees of criticality and security can be hosted on a single physical 1Net LAN.

SUMMARY

This invention provides a method for multiple aircraft subsystems, varying in criticality and security levels, to interchange data on a single Airborne Local Area Network.

DRAWINGS

Figures

FIG. 1, Single 1Net column physical topology

Figure 2:
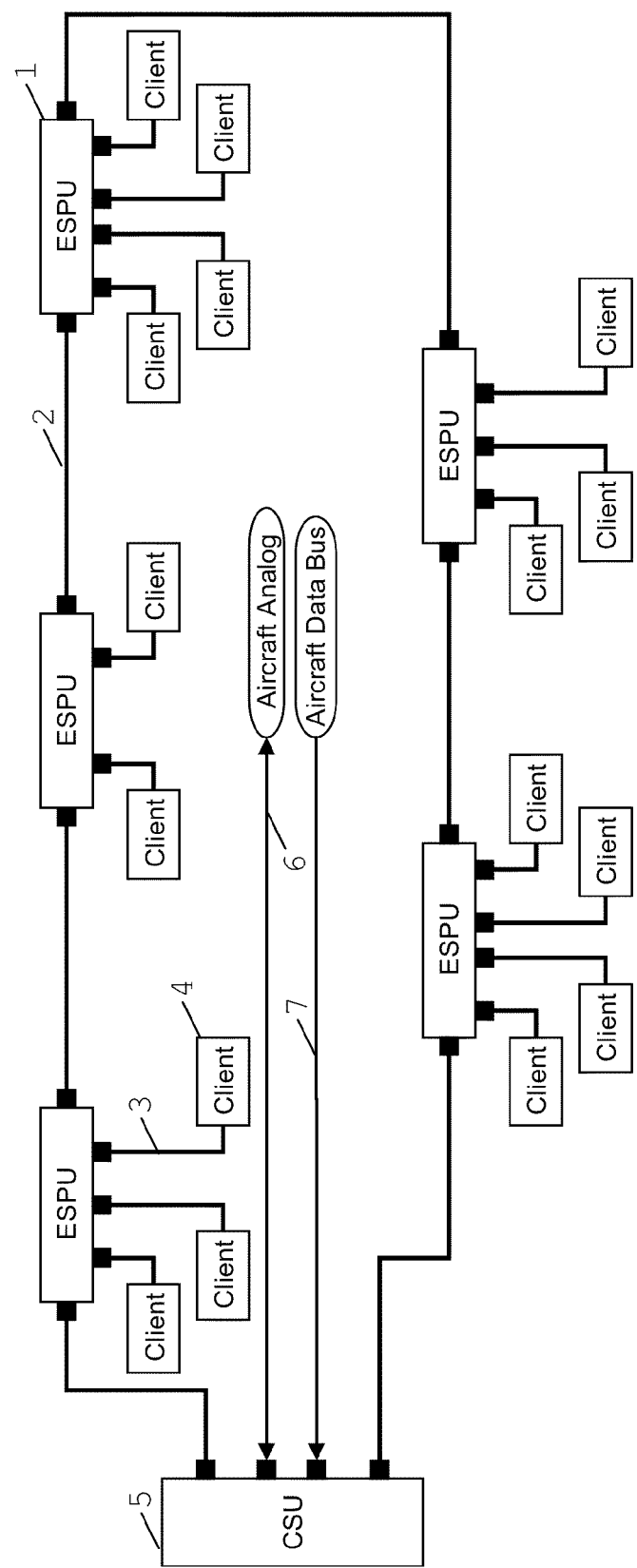
Figure 3:
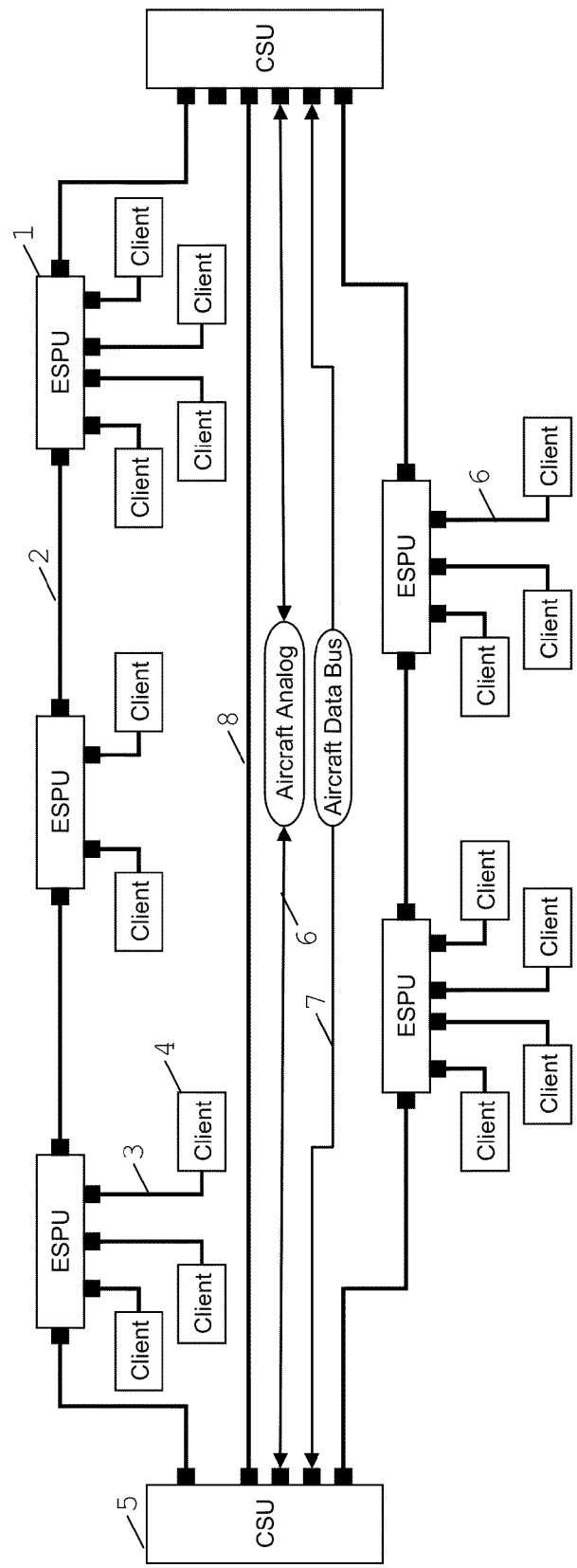
Figure 4:
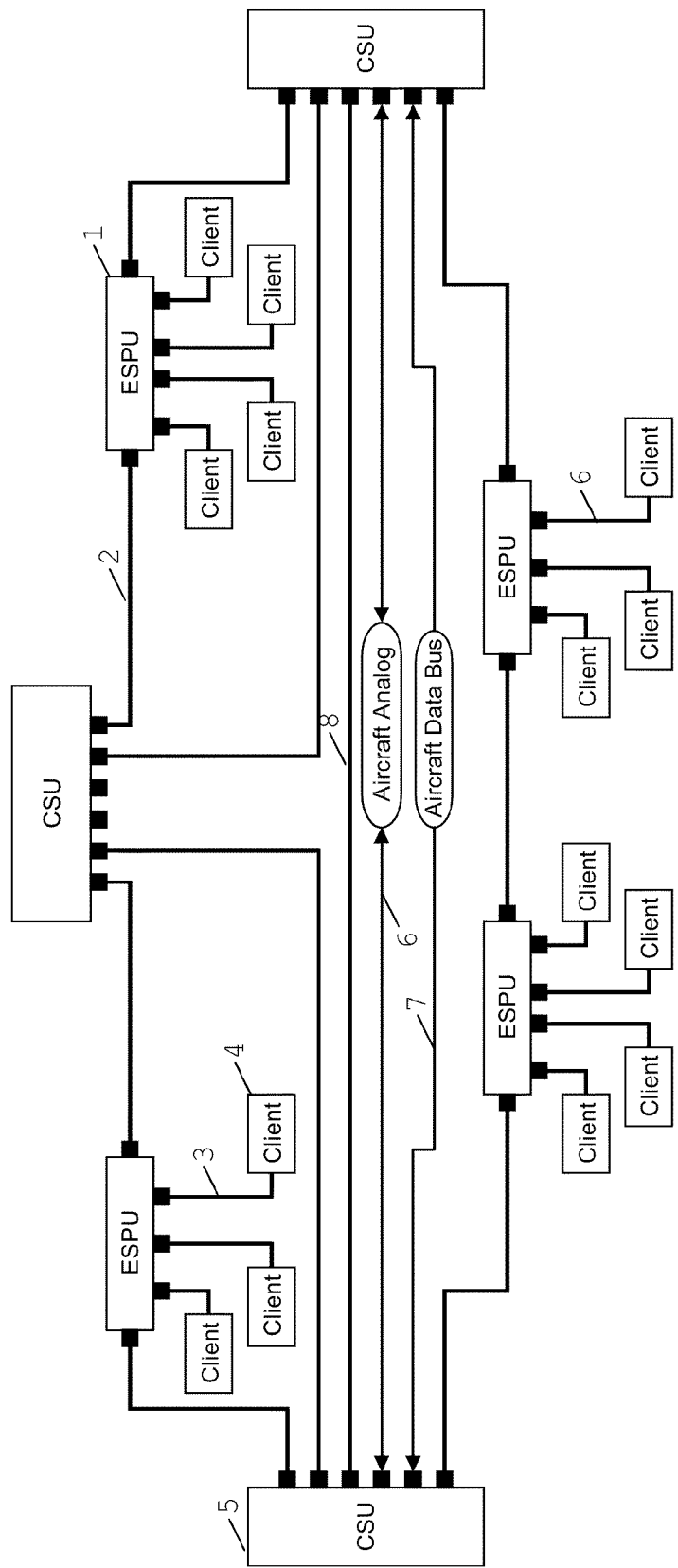
Figure 5:
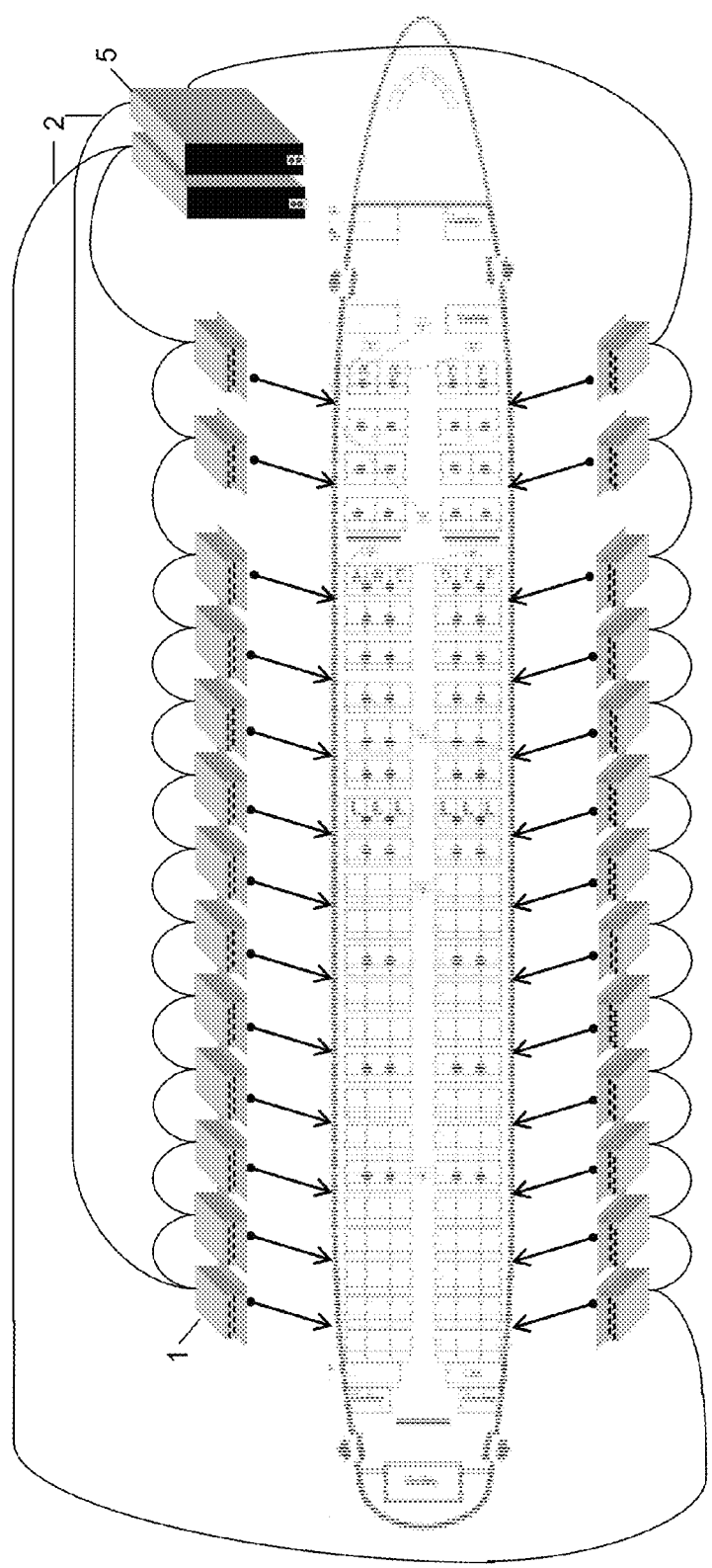
Figure 6:
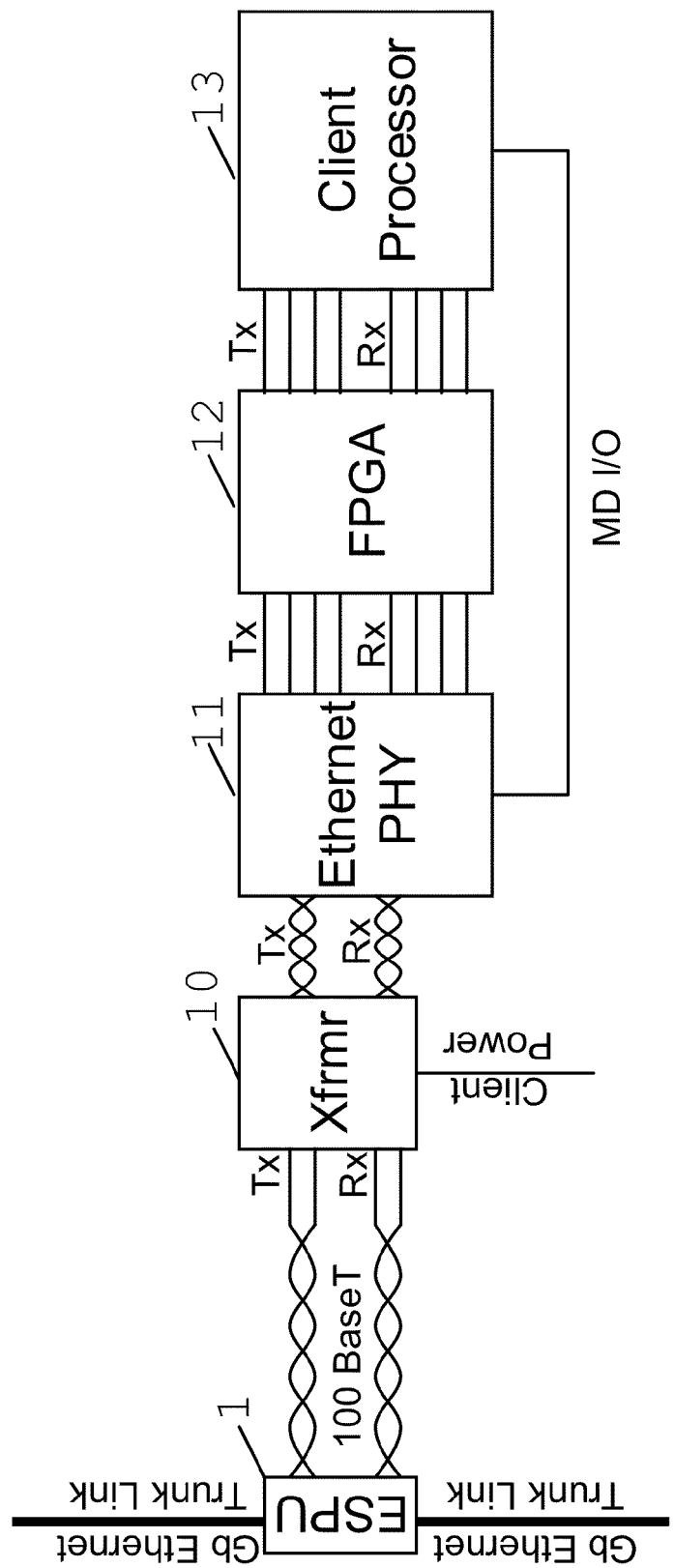
Figure 6A:
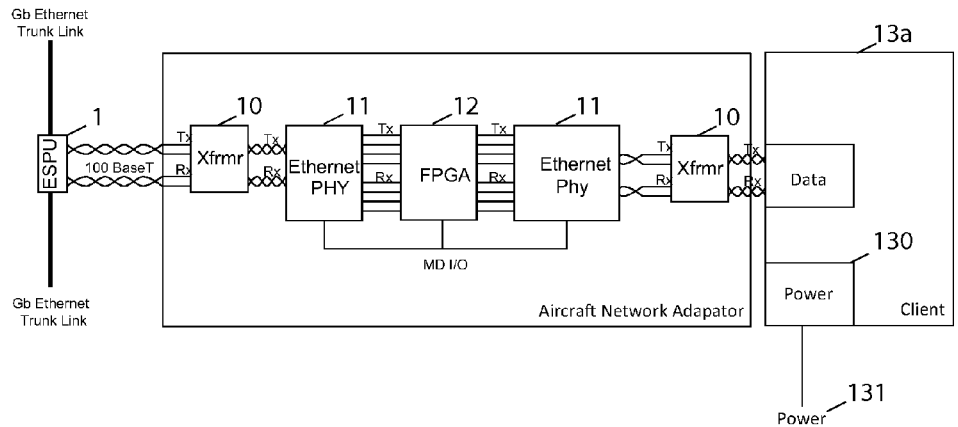

FIG. 2, Single 1Net column physical topology with a single Connectivity Server Unit FIG. 3, Multi-column physical topology of a 1Net local area network FIG. 4, Multi-column physical topology of a 1Net local area network (LAN) with three Connectivity Server Units FIG. 5, Typical 1Net LAN installation on a single aisle narrow body aircraft FIG. 6, Illustration of the FPGA between the 1Net client's physical LAN interface and the client's processor FIG. 6A, Alternative illustration of the FPGA between the 1Net client's physical LAN interface and the client's processor with external client power and an Aircraft Network Interface.

Figure 7:
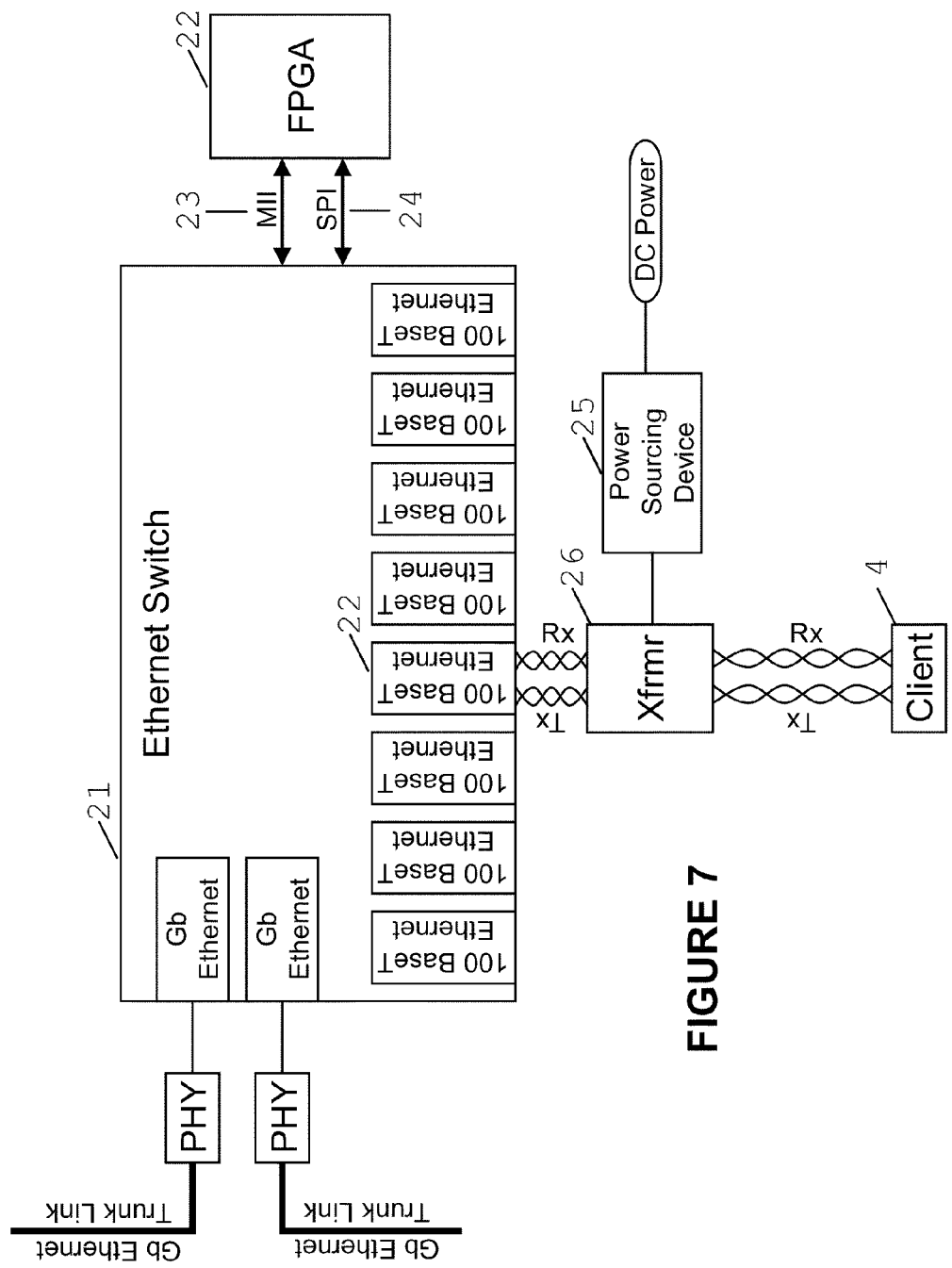

FIG. 7, Illustration of the ESPU's FPGA control of the ESPU's switch

Figure 8:
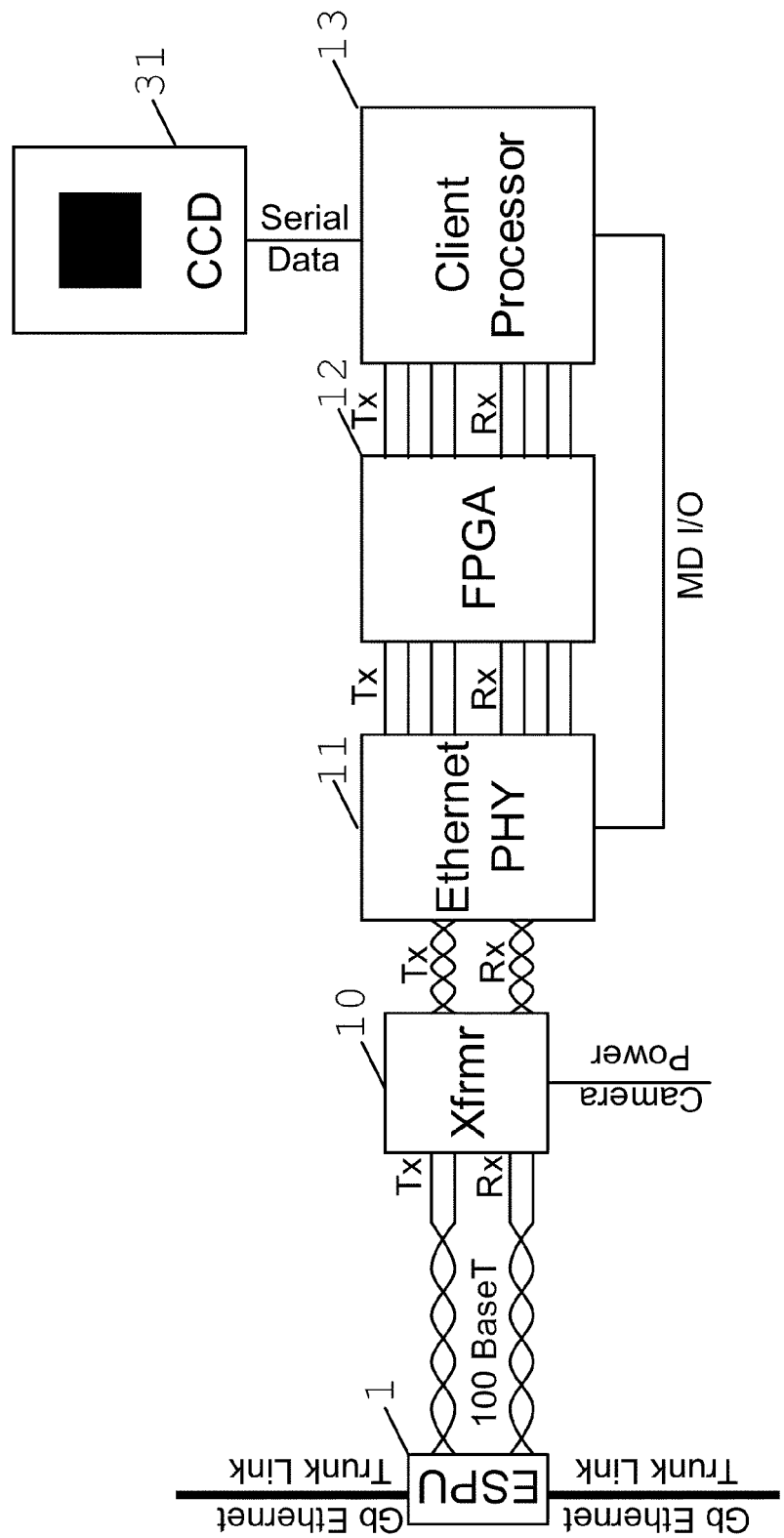

FIG. 8, Illustration of a 1Net LAN Camera, a standard Type 1 client design

REFERENCE NUMERALS

1, Ethernet Switch Power Unit
2, Gigabit Ethernet Interconnect Trunk Line
3, 100 BaseT Ethernet Drop Interconnect
4, Client, which could be a singular unit or an interface to an aircraft subsystem
5, Connectivity Server Unit, provides for processing and storage of data and off-aircraft connectivity to a Wide Area Network
6, Any number, or type, of analog interfaces from aircraft units or subsystems
7, Any number, or type, of digital interfaces from aircraft units or subsystems
8, Gigabit interconnect between Connectivity Servers
9, Unused
10, Transformer in a 1Net Client Unit, used to pull off the 42 volts Power over Ethernet
11, Ethernet Physical Layer Device
12, Client Field Programmable Gate Array, used to filter data coming from and going out to the network 13, Client micro-processor or similar device
14 through 20, unused
21, Ethernet switch fabric
22, 100 BaseT Ethernet switch interface
23, Management Interface between the switch fabric and Ethernet Switch Power Unit Field Programmable Gate Array
24, Serial Parallel Interface between the switch fabric and Ethernet Switch Power Unit Field Programmable Gate Array
25, Power Source (supply) contain within the Ethernet Switch Power Unit
26, Transformer within the Ethernet Switch Power Unit, used to provide the 42 volts of Power over Ethernet to connected clients
27 through 30, Unused
31, Digital Image Receiver

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art Like numbers refer to like elements throughout, and prime notation is used to indicate similar elements in alternate embodiments.

1Net consists of a physical local area network (LAN) topology, pre-defined class of services, pre-defined data domains, and a number of 1Net clients to provide functionality for the aircraft. A 1Net physical LAN topology is architected by one or more gigabit (Gb) Ethernet columns. FIG. 1 illustrates a single 1Net column physical topology. A 1Net column is one or more Ethernet Switch Power Unit (ESPUs) 1 connected in series that ultimately loops back to the first ESPU. Looping the 1Net LAN provides for fault tolerance, in the event one Gb Ethernet cable failed, causing a disconnect between ESPUs, 1Net LAN packets will continue to flow between and amongst all clients by traversing the column in the other direction. In the event two Gb Ethernet cable failed, causing a disconnect between in two points in the 1Net column, only that subset of ESPUs 1 between the failed Gb Ethernet cables would not be able to receive 1Net LAN packets.

Each ESPU 1 has two gigabit (Gb) trunk link 2 interfaces, eight 100 BaseT drops 3 to interface a plurality of types of clients 4 to the 1Net LAN. Each ESPU drop 3 provides Power over Ethernet (PoE), or other low voltage, as the primary power source for 1Net clients 4. 1Net clients 4 provide a variety of aircraft functionality utilizing the 1Net Ethernet LAN to exchange data.

One or more 1Net Connectivity Server (CSU) can be added to one or more gigabit Ethernet 1Net columns. FIG. 2 illustrates a single 1Net column physical topology with a single CSU 5. CSUs have an internal Gb Ethernet switch to provide connectivity in a single column or in a multiple 1Net column physical typology between and amongst multiple 1Net columns. The CSU 5 provides processing, data storage, file server, out of 1Net LAN connectivity and in 1Net LAN wireless connectivity. CSUs 5 can be connected to one or more analog (such as an aircraft cabin public address system or external video source) and/or digital sources (such as another physical LAN, aircraft multiplex bus such as ARINC 429, ARINC 485, CANBUS, digital audio, digital video etc.) for the CSU to process, store or make available on the 1Net LAN.

FIG. 3 is a system diagram illustrating a multi-column physical topology of a 1Net local area network (LAN). Each CSUs 5 have an internal Gb Ethernet switch to provide connectivity between and amongst multiple 1Net columns. Additionally, the CSUs 5 are directly interconnected by a Gb Ethernet 7. Interconnecting the CSUs 1 provide the 1Net LAN with additional fault tolerance. In the event a physical Gb Ethernet trunk link 5 cable between two ESPUs 2 became disconnected 1Net LAN Ethernet packets would continue to get to both sides of the cable disconnection via the CSU 1 interconnection 7. Additional columns can be easily between multiple CSUs, as CSUs have a multiport gigabit switch for interconnecting 1Net columns.

Additional CSUs can also be added to a 1Net LAN. FIG. 4 is a system diagram illustrating a multi-column physical topology of a 1Net local area network (LAN) with three CSUs. These CSUs could be used in a redundant, semi-redundant, or multi-function fashion. In a redundant server topology one CSU is designated as the primary for purposes proving processing, data storage, file server, out of 1Net LAN connectivity and in 1Net LAN wireless connectivity and the other(s) as a backup(s). The backup CSU(s) continually monitor the health of the primary CSU and of the 1Net LAN. Upon the failure of the primary CSU the backup CSU steps in to perform the services.

Alternatively, a 1Net LAN can also be architected such that each CSU performs different aircraft functions. This is accomplished by assigning each CSU would service different aircraft function utilizing the 1Net LAN class of service and data domains more fully described below. Thus, for example, one CSU could host an electronic flight bag function and cabin surveillance and digital video recording (DVR), whilst another CSU was hosting engine parameter recording and Rf Id. Thus, a 1Net LAN could also operate in a semi-redundant fashion by having some aircraft functions hosted in multiple CSUs, monitored as described above, and have other aircraft functions solely hosted in single CSUs.

FIG. 5 illustrates a typical 1Net LAN installation on a single aisle narrow body aircraft. Larger wide body aircraft could be accommodated as well by adding additional 1Net LAN columns between the two CSUs 5.

Any plurality of different Clients can be interfaced to the 1Network. Clients are differentiated in to two types. The first type of client (TYPE 1) is a custom Client specifically designed to meet the requirements for connectivity to the 1Net LAN utilizing the power provided by the ESPU. The second type of client (TYPE 2) is a client that is not specifically designed to interface directly to the 1Net LAN, does not utilize power from the ESPU and is interfaced to the 1Net LAN by an Aircraft Network Adaptor.

The 1Net LAN is designed to host a plurality of different functions varying in criticality and/or security simultaneously. To achieve this, the 1Net LAN implementation is deterministic without usage of software. The 1Net LAN utilizes two independent methods to partitioning 1Net LAN Ethernet packet data. The first is by segregating 1Net LAN data packets by class of service. The second is by segregating 1Net LAN data packets into data domain. Clients subscribe to classes of service and data domains. A client can to subscribe to multiple classes of service and multiple data domains simultaneously. For example, a client could be subscribed to data domain 1, 2 and 3 of class of service A and data domain 3, 4 and 5 of class of service B simultaneously. This implementation allows the 1Net to be setup in a plurality of configuration based upon the desired aircraft application the 1Net is used for.

A 1Net LAN architect can utilize any combination of classes of service and data domains in different ways within the same 1Net LAN and even within a single client. For example a class of service could be partitioned into data domains or alternately data domains could be partitioned into classes of service. Classes of service and data domains could be utilized in a serial fashion by limiting client access to 1Net LAN data packets by both class of service and data domain for heightened security or criticality of functions. Further, 1Net LAN architects need not limited data by both class of service and data domain thereby allowing a client to have access (transmit and/or receive) to a whole class of service and/or a whole data domain.

Operation

1Net LAN data packets are preceded by an Ethernet OSI layer 2 IEEE 802.1Q virtual LAN (VLAN) preamble. This VLAN preamble is utilized to identify each 1Net LAN Ethernet packet classes of service. Access to 1Net LAN classes of service is controlled by a FPGA in every client attached to the 1NET LAN. This FPGA in each TYPE 1 client and Aircraft Network Adaptor is placed between the client's physical 1Net LAN interface and the client's processing unit or in the case of the Aircraft Network Adaptor between the physical 1Net LAN interface and the TYPE 2 client being interfaced to the 1Net LAN. FIG. 6 is a diagram illustrating the FPGA 12 between the 1Net client's physical LAN interface 11 and the client's processor 13. FIG. 6A is an alternative diagram similar to FIG. 6, but where the client 13a includes power 130 via external power 131 and the Aircraft Network Adapter interface is used. The purpose of this FPGA 12 is to filter 1Net LAN data packets to and from the Client's processor 13. The client derives power from the ESPU by taking the common mode DC voltage out the center tap of the transformer 10.

Class of service filtering is accomplished by preprogramming the FPGA with the VLAN preamble identifiers of the 1Net class of services available to and from that client and the VLAN preamble identifiers of the 1Net classes of service absolutely denied to and from that client. In addition, to these preprogrammed 1Net classes of service, the 1Net LAN (via a CSU or other designated client(s)) can add to the embedded device's preprogrammed 1Net classes of service access or denial. However, the 1Net LAN is never able to add classes of service that have been preprogrammed as a denied 1Net class of service that client. For example, a designated 1Net client attempts to add service B to a client preprogrammed to have access to class of service A and denial class of service B. The FPGA would continue to deny service B.

The FPGA filters 1Network packets, to and/or from the client's processing device, not preprogrammed or 1Net LAN programmed for or denied to that client based on the 1Net LAN packet's VLAN preamble identifier. In the above example, where the client had access to class of service A and was denied class of service B any packets received or sent by the client's processor without the service A preamble are filtered out by the embedded device. Thus, the 1Net LAN Ethernet data packets from the 1Net LAN to the client's processor without the service A VLAN preamble identifier are stopped at the FPGA and are never sent to the client's processor. Further, data packets sent from the client's processor to the 1Net LAN without the service A VLAN preamble identifier are stopped at the FPGA and never reach the 1Net LAN. For example, a FPGA in a client performing functions X, Y and Z would be preprogrammed or programmed by the 1Net LAN to filter out any 1Net LAN Ethernet packet without the VLAN preamble identifier of X, Y or Z 1Net class of service. Thus, in this example, if the client's FPGA received a 1Net LAN Ethernet packet on the 1Net LAN with a VLAN preamble identifier of 1Net class of service A the FPGA would not forward the data to the client's processor. Conversely, whenever the client's FPGA received 1Net LAN Ethernet packet with a VLAN preamble identifier of 1Net class of service X identifier the FPGA would forward the data the clients processing unit/TYPE 2 client.

1Net client access to 1Net data domains is restricted at the ESPU. This is accomplished by utilizing GARP (Generic Attribute Registration Protocol) Multicast Registration Protocol (GRMP) defined by IEEE 802.1P. 1Net multicasts (one to many) are accomplished by utilizing predefined MAC addresses in the "to" field of the 1Net LAN Ethernet header. These predefined multicast MAC addresses are then specifically designated to 1Net data domains. Every ESPU has a FPGA that controls the 1Net LAN Ethernet switch. FIG. 7 is a diagram illustrating the ESPU's FPGA 22 control of the ESPU switch 21. The FPGA 22 is preprogrammed with multicast MAC address to be sent to all clients 4 for management and control of the 1Net LAN and is also preprogrammed with multicast MAC address that are always denied to and from the clients 4 attached to that ESPU. At power the FPGA 22, utilizing the SPI Ethernet Switch interface 24, loads the Ethernet Switch 21 multicast address register for all 100 BaseT Ethernet ports 22 with the preprogrammed multicast MAC addresses to be sent to all clients 4. The Ethernet Switch 21 then forwards all Gb Ethernet Trunk Link 1Net LAN packets that have one of the multicast MAC addresses in the Ethernet Switch's 21 multicast address register in the "to" field of the packet header to all 100 BaseT Ethernet ports 22. Conversely, the Ethernet Switch 21 also forwards all 100 BaseT Ethernet LAN packets from the client that have one of the multicast MAC addresses in the Ethernet Switch's 21 multicast address register in the "to" field of the packet header to the Gb Ethernet Trunk Link ports.

In addition to these preprogrammed multicast MAC addresses, a client 4 can send a request to the ESPU to subscribe to a 1Net LAN data domain. Further the client 4 may request to receive 1Net LAN data domain packets, send 1Net LAN data domain packets, or send and receive 1Net LAN data domain packets. The client 4 merely sends a management packet, via the 100 BaseT Ethernet interface, to the ESPU. The ESPU Ethernet Switch 21, upon receipt of the management packet, forwards it to the FPGA 22 via the MII interface 23. The FPGA 22 compares the requested multicast MACC address to the list of preprogrammed multicast MACC addresses to be denied to all clients 4. Where the FPGA 22 found the client requested multicast MACC address matched a multicast MACC address preprogrammed for denial the FPGA 22 takes no further action. Where the FPGA 22 did not find a match the FPGA 22, utilizing the SPI Ethernet Switch interface 24, loads the client requested multicast MACC address into the multicast register for the requesting client's 4 100 BaseT port 22. For send and send and receive client requested 1Net LAN data domains Ethernet Switch 21 forwards all Gb Ethernet Trunk Link 1Net LAN packets that have the client 4 requested multicast MAC addresses in the "to" field of the packet header to all 100 BaseT Ethernet ports. For receive and send and receive client requested 1Net LAN data domains Ethernet Switch 21 forwards all 100 BaseT Ethernet client 1Net LAN packets that have the client 4 requested multicast MAC addresses in the "to" field of the packet header to the Gb Ethernet Trunk Link ports. The ESPU provides PoE or other low voltage to the client over the 100 BaseT 22 Transmit and Receive twisted pair. This is accomplished by putting DC Power into a power source device 25 and coupling the controlled DC voltage onto the transmit and receive twisted pair by a transformer 26.

In addition to subscribing to classes of service and requesting data domains the 1Net Aircraft Network Adaptor's embedded FPGA has the ability to read, process, and react to data in 1Net LAN Ethernet packet payloads. The FPGA has the means to receive Type 2 client and Aircraft Network Adaptor configuration dataset to determine proper processing and routing of 1Net LAN Ethernet packet data and/or external TYPE 2 client data. By doing this multiple Type 2 clients and Aircraft Network Adaptors can be uniquely managed. For example, three Type 2 clients located in different physical locations of the aircraft, each interfaced to the 1Net LAN by separate Aircraft Network Adaptors performing the same function in those different locations (such as cabin lighting control or smoke detection). 1Net LAN Ethernet packet data payload, to and from these three Aircraft Network Adaptors, would contain a unique identifier for each of the three clients as setup in the Aircraft Network Adapter by the Type 2 client configuration dataset. ESPUs connecting these three Aircraft Network Adaptors would all forward the 1Net LAN Ethernet packets to all three Aircraft Network Adaptors that had previously subscribed to the class of service and requested access to the data domain. The three 1Network Adaptors embedded devices would examine the payload to determine whether the payload identifier of the 1Net LAN Ethernet packet matched the identifier in the configuration dataset for the TYPE 2 client attached to that Aircraft Network Adaptor. Where the Aircraft Network Adaptor FPGA determined there was a match the 1Net LAN Ethernet data packet would be forwarded to and/or from the client. Where the Aircraft Network Adaptor determined there was not a match the 1Net LAN Ethernet packet data would not be forwarded to the client, thereby filtering the data.

The 1Net LAN can gain access to one or more external local area and/or wide area networks utilizing an Aircraft Network Adapter. The Aircraft Network Adapter would interface the 1Net LAN to one or more external networks by configuring it as a class of service and/or a data domain. Thus, the Aircraft Network Adaptor gathers data from the external network, attaches the predetermined data domain data packet header and/or class of service preamble, places the gathered data in the payload and sends it out on to the 1Network. Conversely, the Aircraft Network Adaptor would also receive 1Net LAN Ethernet packet data, with the predetermined data domain data packet header and/or class of service preamble, and pass it along to the external network.

As mentioned above, 1Net LAN functionality accomplished by attaching one or more clients to the 1Net LAN. These clients are Embedded Seat Players, Cabin Attendant Terminal, Cockpit Crew Terminal, Cameras (for surveillance), Wireless Access Points, Pico Cells, GPS Module, Rf Identification, Overhead Electronics Unit, and Aircraft Network Adapters.

The 1Net Embedded Seat Player (ESP) is a small device installed in the back of the headrest of passenger seats. This device consists of a display screen, capacitive buttons, credit card reader, replaceable headphone jack, USB jack, and a jack to connect to an ESPU. As with all Type 1 clients, the ESP has an embedded FPGA to control class of service and data domain access, described above. At the core of the ESP is a hardware/software accelerator to produce a graphic image on the ESP's display device.

The unique implementation of the ESP is that it provides an internet like experience. However, this experience is not done by loading HTML from the CSUs, which would require significant processing at the ESP. The ESP display image is produced either prior to or in real time by the CSU. This allows the ESP to use its graphical accelerator to render the complete image. In cases where the user is required to input text an OSD (on screen display) the ESP overlay function provides the user a means to input text on top of the image. Where the ESP has multiple overlay windows, content can be format to make maximum advantage of the graphical windows to provide the best possible user experience. The typical accelerator provided in the ESP is a JPEG image processor or a movie player. With the usage of these accelerators it is possible to provide a rich user experience while utilizing a minimal amount of ESP CPU processing power.

The Cabin Attendant Terminal is utilized by cabin attendants to control the 1Net system and perform unique cabin attendant functions (such as viewing camera video located throughout the cabin, controlling cabin lighting control, and attendant call). In addition to cabin attendant usage, maintenance personnel use the Cabin Attendant Panel for aircraft maintenance function (such as reviewing recorded aircraft parameter data, interfacing aircraft subsystem status). The Cabin Attendant Terminal is an ESP with unique firmware and software. The main distinction between an ESP and a Cabin Attendant Terminal, as they look identical, is the preprogrammed class of services and data domains allowed to and denied from each unit. By allowing and denying different 1Net LAN classes of service and data domains the CSUs interact with the Cabin Attendant Panel with different content, menus and control select features not available at ESP.

The Cockpit Crew Terminal is utilize by Flight Deck personnel to communicate with the cabin attendant crew, view camera video located throughout the cabin and exterior of the aircraft, interact with various Flight Deck Crew software applications. The Cockpit Crew Terminal is significantly different than the Cabin Attendant Terminal and ESPU. Like the ESP the Cockpit Crew Terminal has display screen, capacitive buttons, replaceable headphone jack, USB jack, and a jack to connect to an ESPU. As with all Type 1 clients, the Cockpit Crew Terminal has an embedded FPGA to control class of service and data domain access, described above. Unlike an ESP the Cockpit Crew Terminal does not have to have a hardware/software accelerator, as the Cockpit Crew Terminal Device has a robust microprocessor capable of running software applications (such as an Electronic Flight Bag, Moving Map, or Navigational Software). In addition, the Cockpit Crew Terminal also has an embedded solid state bulk memory to serve as a hard drive and a bezel around the display to provide for a infra-red touch screen feature.

As mentioned above, a Type 1 client Camera can be hosted on a 1Net LAN. FIG. 8 illustrates a 1Net LAN Camera, as can be seen from the diagram, the Camera is a standard Type 1 client design with the addition of the camera 31 component.

1Net LAN Wireless Access Points, Pico Cells, GPS Module and RFID device are implemented similarly. By merely placing the desired functional components in the design and interfacing them to the Client Processor 13 a polarity of different clients can be designed and fielded on a 1Net LAN.

The Aircraft Network Adapter, similar to all Type 1 clients has a transformer, Ethernet PHY, FPGA, and Client communication electronics to support the client's electrical means of connection. In addition, a number of different Aircraft Network Adapter supporting different types of analog and digital interfaces are envisioned, including but not limited to, ARINC 429, ARINC 485, ARINC 624, ARINC 629, ARINC 717, CAN Bus, MOD Bus RS-343, RS-170, rs 232, rs422, Ethernet, SMPTE-259, differential composite NTSC, discrete I/O, and analog audio. The Aircraft Network Adapter is a common to Type 1 clients except does not have the local processing unit that provides the function as continued within, the Type 2 client is external to the network. A type 2 client used 1Net ALAN for connectivity while obtaining their power from an means other than 1Net.

Operation

Preferred Embodiment

Many modifications and other embodiments of the invention will come to the mind of one skilled in the art having the benefit of the teachings presented in the foregoing descriptions and the associated drawings. It is to be understood that the invention is not to be limited to the specific embodiments disclosed, and that modifications and embodiments are intended to be included within the scope of the appended claims.

That which is claimed is:

1. A method to provide connectivity and power for different aircraft sub-systems varying in levels of criticality and intended purposes while using a single partitioned Airborne Local Area Network (ALAN), said method comprising:
providing a plurality of clients interfaced to said ALAN, each of said clients embodying an aircraft sub-system;
distributing power from at least one Ethernet Switch Power Unit (ESPU) arranged on said ALAN to a client group connected to each said ESPU, said client group including one or more of said clients; and
selectively providing network connectivity among each of said clients by way of at least one Connectivity Server Unit (CSU) arranged on said ALAN where each said CSU includes a Field Programmable Gate Array (FPGA) located between a physical ALAN interface of said client and a processor of said client and said FPGA is preprogrammed with data domain multicast MAC addresses that are always routed to and from all ESPU drops for network switching functions enabling said network connectivity and thereby controlling connectivity among said clients and functionality of said clients on said ALAN.

2. The method as claimed in claim 1 further including, differentiating said clients into one of two types including
a first type of client being specifically designed to meet connectivity requirements by utilizing power provided by said ESPU, and
a second type of client not specifically designed to interface directly to said ALAN, utilizing power from a source other than said ESPU, and interfaced to said ALAN by an aircraft network adaptor.

3. The method as claimed in claim 2 further including, partitioning data packets forming Ethernet packet data provided on said ALAN by,
segregating said data packets by class of service, and
segregating said data packets into data domain.

4. The method as claimed in claim 3 further including, subscribing each said client to at least one of said classes of service and at least one of said data domains.

5. The method as claimed in claim 4 wherein said clients are enabled to subscribe to multiple classes of service and multiple data domains simultaneously.

6. The method as claimed in claim 5 further including, limiting access of at least one of said clients to said data packets on said ALAN by both said class of service and said data domain.

7. The method as claimed in claim 5 wherein,
each said CSU is configured to provide said clients with an interface to both on-aircraft systems and off-aircraft systems, and
each said ESPU is configured to provide network switching functions.

8. An apparatus to provide connectivity and power for different aircraft sub-systems varying in levels of criticality and intended purposes while using a single partitioned Airborne Local Area Network (ALAN), said apparatus comprising:
a plurality of clients interfaced to said ALAN, each of said clients embodying an aircraft sub-system;
at least one Ethernet Switch Power Unit (ESPU) arranged on said ALAN and distributing power among a client group connected to each said ESPU, said client group including one or more of said clients; and
at least one Connectivity Server Unit (CSU) arranged on said ALAN and providing network connectivity among each of said clients, each said CSU including a Field Programmable Gate Array (FPGA) located between a physical ALAN interface of said client and a processor of said client, said FPGA being preprogrammed with data domain multicast MAC addresses that are always routed to and from all ESPU drops so as to control connectivity among said clients and functionality of said clients on said ALAN.

9. The apparatus as claimed in claim 8 wherein each said CSU is configured to provide said clients with an interface to both on-aircraft systems and off-aircraft systems.

10. The apparatus as claimed in claim 8 wherein each said ESPU is configured to provide network switching functions.

11. The apparatus as claimed in claim 10 wherein said network switching functions are operable by way of routing information preloaded within each said FPGA.

12. The apparatus as claimed in claim 8 wherein each said FPGA is preloaded with a net-list.

13. The apparatus as claimed in claim 12 wherein each of said clients includes classes of service that are allowed or denied based upon known types of data required to meet client operational requirements, said classes of service being determined by a unique package identifier selected from a group consisting of Ethernet packet identifiers, virtual local area network preamble identifiers, multicast addresses, and port numbers.

14. The apparatus as claimed in claim 12 wherein said FPGA of a given one of said clients filters out requests to send any messages that are not formatted correctly for operational requirements of said given one of said clients.

15. The apparatus as claimed in claim 14 wherein said FPGA restricts bandwidth based upon said operational requirements.

16. The apparatus as claimed in claim 8 wherein one or more of each of said clients includes a local processor therein.

17. The apparatus as claimed in claim 8 wherein one or more of each of said clients includes an internal device interfacing with an external device that contains a processor.

18. The apparatus as claimed in claim 9 wherein a payload of each packet of data is encryptable by said apparatus upon network entrance and removal so as to remove any threat of network data snooping.

19. The apparatus as claimed in claim 9 wherein at least one of each of said clients is an external unit that includes all functions of at least one of said aircraft sub-systems and said external unit interfaces with an Aircraft Network Adapter.

20. The apparatus as claimed in claim 9 wherein at least one of each of said clients is a proprietary client that includes all functions of at least one of said aircraft sub-systems and said proprietary client includes a field programmable gate array embedded therein.

21. The apparatus as claimed in claim 20 wherein said proprietary client uses power supplied over a powered Ethernet connection to said ESPU.

22. The apparatus as claimed in claim 20 wherein said proprietary client is an embedded seat player with all required functions embedded therein so as to meet all functional requirements for a passenger interface, said interface selected from a group consisting of a screen, a keypad, a phone jack, a universal serial bus connector, a credit card reader, and a control pad.

23. The apparatus as claimed in claim 20 wherein said proprietary client is a cabin attendant terminal with all required functions embedded therein so as to meet all functional requirements for a flight attendant interface or maintenance personnel interface, said interface selected from a group consisting of a screen, a keypad, a phone jack, a universal serial bus connector, a credit card reader, and a control pad.

24. The apparatus as claimed in claim 20 wherein said proprietary client is a cockpit crew terminal with all required functions embedded therein so as to meet all functional requirements for a pilot interface, said interface selected from a group consisting of a screen, a keypad, a phone jack, a universal serial bus connector, a solid state bulk memory, an infrared bezel for touch screen functionality, and a control pad.

25. The apparatus as claimed in claim 20 wherein said proprietary client is an Ethernet camera with all required functions embedded therein so as to multicast video/audio data, to store video/audio data, and to filter video/audio data based on predetermined parameters including motion and temperature.

26. The apparatus as claimed in claim 20 wherein said proprietary client is a wireless access point with all required functions embedded therein so as provide wireless connections to said ALAN by passenger electronic devices.

27. The apparatus as claimed in claim 20 wherein said proprietary client is a Pico cell with all required functions embedded therein so as provide cell phone connection to passenger cell phones and provide an external voice-over-Internet-protocol link to a service provider over said ALAN via said CSU.

28. The apparatus as claimed in claim 19 wherein said client is a Pico cell with all required functions embedded therein so as provide cell phone connection to passenger cell phones and provide an external voice-over-Internet-protocol link to a service provider over said ALAN via said ANA.

29. The apparatus as claimed in claim 20 wherein said proprietary client is a radio frequency identification device with all required functions embedded therein so as perform unique tracking of items selected from a group consisting of cargo, duty free items, galley carts, stowed items, flight crew, cabin crew, ground crew, airline property, and passenger property.

30. The apparatus as claimed in claim 20 wherein said proprietary client is a global positioning system module with all required functions embedded therein so as provide information selected from a group consisting of coordinated universal time, present position, ground speed, flight path, and altitude.

31. The apparatus as claimed in claim 19 wherein said client is any aircraft unit that is required to move data from one point to another in an aircraft, said data including information selected from a group consisting of fire detection, passenger address, waste/water indications, door open/close indications, cabin fault reporting information, temperature indication, air quality as pertaining to hazards conditions, metal detector information, explosive detector information, and overhead electronics unit information including reading light control, cabin lighting, and attendant call.

32. The apparatus as claimed in claim 18 wherein one or more of said clients utilize power from a source other than said ESPU.

33. An apparatus to provide connectivity and power for different aircraft sub-systems varying in levels of criticality and intended purposes while using a single partitioned Airborne Local Area Network (ALAN), said apparatus comprising:
a plurality of clients interfaced to said ALAN, each of said clients embodying an aircraft sub-system;
at least one Ethernet Switch Power Unit (ESPU) arranged on said ALAN and distributing power among a client group connected to each said ESPU, said client group including one or more of said clients; and
at least one Connectivity Server Unit (CSU) arranged on said ALAN and providing network connectivity among each of said clients, said CSU being connected to aircraft analog sources and aircraft digital sources, each said CSU including a Field Programmable Gate Array (FPGA) located between a physical ALAN interface of said client and a processor of said client, said FPGA being preprogrammed with data domain multicast MAC addresses that are always routed to and from all ESPU drops so as to control connectivity among said clients and functionality of said clients on said ALAN.

34. The apparatus as claimed in claim 33 wherein each said CSU is configured to provide said clients with an interface to both on-aircraft systems and off-aircraft systems and at least one said CSU includes functions selected from a group consisting of processing, data storage, file server capability, out-of-ALAN connectivity, and in-ALAN wireless connectivity.

35. The apparatus as claimed in claim 34 wherein each said ESPU is configured to provide network switching functions.

36. The apparatus as claimed in claim 35 wherein at least one said CSU includes an aircraft network adaptor connected to said client.

37. The apparatus as claimed in claim 36 wherein one or more of said clients utilize power from a source other than said ESPU.

38. A system to provide connectivity and power for different aircraft sub-systems varying in levels of criticality and intended purposes while using a single partitioned Airborne Local Area Network (ALAN), said system comprising:
an aircraft including an ALAN;
a plurality of clients interfaced to said ALAN, each of said clients embodying an aircraft sub-system;
more than one Ethernet Switch Power Unit (ESPU) arranged in series on said ALAN and distributing power among a client group connected in parallel to each said ESPU, said client group including one or more of said clients;
at least one Connectivity Server Unit (CSU) arranged on said ALAN and providing network connectivity among each of said clients, said CSU being connected to both analog sources and digital sources of said aircraft, each said CSU including a Field Programmable Gate Array (FPGA) located between a physical ALAN interface of said client and a processor of said client, said FPGA being preprogrammed with data domain multicast MAC addresses that are always routed to and from all ESPU drops so as to control connectivity among said clients and functionality of said clients on said ALAN; and wherein each said ESPU and each said CSU form a ring topology such that said ALAN is failure resistant.

39. The system as claimed in claim 38 wherein more than one said CSU is present in said ALAN and each said CSU are directly connected to one another by a gigabit Ethernet connection.

40. The system as claimed in claim 39 wherein each said CSU is configured to provide said clients with an interface to both on-aircraft systems and off-aircraft systems and at least one said CSU includes functions selected from a group consisting of processing, data storage, file server capability, out-of-ALAN connectivity, and in-ALAN wireless connectivity, and each said ESPU is configured to provide network switching functions.

41. The system as claimed in claim 40 wherein at least one said CSU includes an aircraft network adaptor connected to said client.

42. The system as claimed in claim 41 wherein one or more of said clients utilize power from a source other than said ESPU.

* * * * *